United States Patent Office 2,700,681
Patented Jan. 25, 1955

2,700,681

PREPARATION OF IMINES

Richard Nelson Blomberg, Ward, and William F. Bruce, Havertown, Pa., assignors, by mesne assignments, to American Home Products Corporation, New York, N. Y., a corporation of Delaware No Drawing. Application January 31, 1952, Serial No. 269,348

4 Claims. (Cl. 260—566)

This invention relates to the preparation of imino compounds and more particularly relates to the preparation of specific imino compounds and their utilization in the preparation of valuable amines and derivatives thereof.

This application is a continuation-in-part of our application Serial No. 35,058 filed June 24, 1948.

In the prior art it is found that condensation reactions of aldehydes with either ammonia or organic amines can take place without great difficulty, the products formed being aldehydeammonias or aldimines. However, in attempting the condensation of ketones and organic primary amines, it has heretofore been found either that the reaction would not take place as expected or that the products isolated were not ketimines as one might expect but complex condensation or polymerized products.

This invention involves the discovery of a process for successfully obtaining imines by the condensation of a ketone with a primary amine and in utilizing the imines produced for obtaining useful polymers, antioxidants and valuable amino compounds. By the use of the aforesaid imines, corresponding amino compounds may be prepared. Thus, valuable amino compounds can be synthesized from readily available substances and with far fewer steps than heretofore thought possible, and in good yield.

Considering initially the preparation of desirable imines, the reaction of a ketone and a primary amine may be represented by the following general equations:

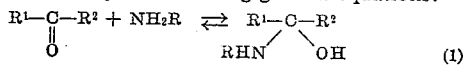

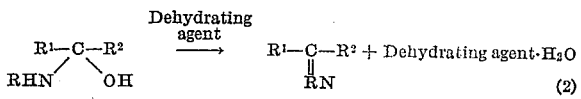

In the above equations the ketone may be a cycloalkyl type or $R^1$ and $R^2$ may represent an alkyl or aralkyl radical or a substituted aralkyl radical while R is intended to represent a lower alkyl radical, such as methyl or ethyl. By substituted aralkyl it is intended that one or more of the hydrogen atoms on the ring may be replaced by an alkyl, amino, mono- or di-substituted amino, chloro, hydroxy or lower alkoxy radical, or in fact any non-interfering substituents or substituents. Acidic substituents, while they may react with the dehydrating agent, do not interfere since the same acidic group may be regenerated by adding acid to the product.

In accordance with this invention, it has been found that specific ketones can successfully be combined with specific primary amines to form stable imino products by operating in an alkaline environment, removing water with an alkaline dehydrating agent and taking care that the imino compound is formed in the substantial absence of oxygen. The initial addition of ketone and nitrogenous reagent produces an intermediate product which may be isolated if desired. The addition product is then dehydrated by the use of a selected dehydrating agent. The water and dehydrating agent in the form of a complex is thereafter removed from the reaction mixture to obtain the desired imino compound. The imino product resulting from the described process after isolation exists under normal conidtions together with its tautomeric isomer which forms as a natural phenomenon known with compounds of this type.

The proportions of the reactants are not critical or controlling since the condensation may take place equally well whether the reactants are on an equimolar basis or whether one is in excess. When operating on a batch procedure, it has been found good practice to have that reactant in excess which is more easily removable from the reaction process after the reaction is completed. For example, when one reacts acetone with methylamine, the latter is preferably used in excess since it is easier to remove it from the mixture once the reaction has been terminated and it forces the reaction to completion with respect to acetone, thus eliminating the acetone by reaction.

One advantageous method of carrying out the addition reaction is to use such temperature and pressure conditions that the amine can be maintained in liquid form. Thus, when operating at normal atmospheric pressure, temperatures from about 0° to as low as about −80° C. can be utilized with low boiling reactants. In general, the best temperature for liquid phase operation depends on the boiling point of the lower boiling reactant used and is selected to be somewhat below this point.

The invention is especially valuable in preparing imines that are relatively low-boiling, such as those boiling below about 100° C., or where one must use one or more reactants that boil below about 100° C. It is clear that where low boiling reactants must be used or where a low boiling product is formed, water cannot be distilled off in the usual manner without risking loss of reactants or product. The present invention avoids the necessity for high temperatures or removal of water by distillation.

In one method of operation, the reaction mixture within the temperature range aforesaid and containing the addition product of ketone and amine is cooled to the point where the addition product solidifies. Thereafter, an alkaline solid dehydrating agent is added in an amount at least sufficient to combine with and remove a substantial amount of water. Suitable alkaline dehydrating agents are those alkaline compounds whose cations fall within the group I–A and group II–A metals of the periodic table. These may be used either singly or in admixture. As examples of particularly effective dehydrating agents may be mentioned potassium hydroxide, potassium carbonate, calcium oxide and mixtures of sodium hydroxide and at least about 10% potassium hydroxide, by weight. Surprisingly, sodium hydroxide by itself has been found to be only weakly effective in removing water.

The dehydration step may be carried out at a temperature range of from about 5° to 80° C. and preferably at room temperature because of convenience. In order to avoid polymerization or other undesired side reactions, it is important to operate under such conditions as to exclude oxygen. In order to exclude oxygen, the reactants may be held in a vessel capable of withstanding pressure and an inert or reducing gas such as ethane, propane, carbon monoxide, helium, nitrogen or hydrogen may be added. It has been found, for best results, that dehydration should be carried out until approximately 80–90% of the water has been removed. The time for terminating the dehydration operation is determined by observing either the extent of solution of the dehydrating agent and by weighing the separated water layer or by observing the change in volume or weight of the dehydrating agent. If less than about 80% of the theoretical amount of water has been obtained, more agent may be added and the reaction permitted to go on for an additional length of time.

The organic product is distilled under conditions excluding the presence of oxygen. This may be carried out by passing a stream of inert or reducing gas through the distilling zone, using such gases as indicated above, or if desired, in the presence of a small amount of antioxidant, such as hydroquinone.

In a variation of the above method involving a more preferred procedure for obtaining imines, the addition product is not separately obtained but the amine is added to the dehydrating agent followed by the addition of ketone. The reaction temperature is held at a point at which the particular dehydrating agent effectively removes the water. When the removal of water is substantially complete the organic product is distilled. It must be emphasized that here, as well as in the first procedure described, oxygen must be excluded from the reaction during the formation of the imine since degradation products and possibly polymerized products are formed when even small amounts of oxygen are present.

The procedures as broadly described above may be used to prepare a large number of useful imino compounds, depending on the initial ketone used. A particularly important group of compounds may be prepared, for example, when starting with such ketones as acetone, 4-methyl-2-hexanone, 2-heptanone, 4-methyl-2-heptanone, 6-methyl-2-heptanone, phenylacetone, para or meta tolyl acetone, anisyl acetone, vanillyl acetone, piperonyl acetone, and others of like nature having the general formula

where $R^1$ and $R^2$ represent the radicals as indicated above.

Turning now to the utilization of the novel imines produced as indicated above, these compounds are not only highly useful as intermediates in preparing amines, as will be described below, but are useful per se as copolymerizers for obtaining useful liquid or solid polymer products, compounding agents for rubber, as antioxidants for various substances such as gasoline, as intermediates in the preparation of antihistaminic compounds, and of course as intermediates in other organic reactions as would be obvious to one skilled in the art. A particularly important field of use for the novel imino compounds of the invention is as intermediates in the preparation of special amino compounds as will now be described.

Certain amino compounds are known to possess physiological actions that are highly useful in the medical field. For example, certain classes of amines have a physiological action which is variously referred to as a pressor, vasoconstrictor or sympathomimetic action. Other amines may have central nervous stimulating action and still other amines may have combined actions. The imines, prepared as described above, can thus be used to obtain from simple starting substances important amino compounds which heretofore required complicated and lengthy procedure for their syntheses.

A pressor and central nervous stimulating amine compound such as the well-known dl-desoxyephedrine can easily be prepared merely by hydrogenating the N-methyl imine of phenylacetone. The hydrogenation can be carried out by dissolving the ketimine in any suitable solvent, such as various alcohols, esters, hydrocarbons, etc., and hydrogenating in the presnce of a hydrogenation catalyst such as nickel, platinum or palladium, either alone or on a carrier such as charcoal, kieselguhr, or alumina, silica, asbestos, etc. under the usual hydrogenation conditions.

In this manner, one may thus prepare the N-alkyl derivatives of 2-amino heptane, 1-m-tolyl-2-aminopropane; 1-p-tolyl-2-aminopropane; 1-m-hydroxyphenyl-2-aminopropane; 1-p-hydroxyphenyl-2-aminopropane; or 1-(m,p-dihydroxyphenyl)-2-aminopropane, depending on the particular imine one uses which in turn merely depends on the particular ketone and alkyl amine used in the imino preparation.

A pressor amine having valuable pharmacological action is the compound described in a copending application of Abell et al., Serial No. 775,754, filed September 23, 1947, now Patent No. 2,590,079. This amine, identified as N-methyl-omega-phenyl-tertiary butyl-amine, can also be prepared in a very simple manner by utilizing one of the imino compounds of the present invention, namely, N-methyl-isopropylidenimine.

In order to prepare the above-mentioned N-methyl-omega-phenyl-tertiary butyl-amine or compounds similar thereto, a Grignard complex is first formed by first reacting an N-alkyl-isopropylidenimine with benzyl or substituted benzyl magnesium halide and a solvent at a refluxing temperature. It has been found that superior yields can be obtained when operating within the range of about 110° to about 135° C., with a preferred temperature of about 128° C. However, it should be made clear that the reaction can be carried out at temperatures above or below the preferred range with fair yields. The solvent for the Grignard reaction may be one whose boiling range falls normally within the desired reaction temperature range or may be a low boiling solvent which is utilized by carrying out the reaction under pressure in order to achieve the desired temperature conditions. Thus, solvents such as toluene, kerosene, xylene, dibutyl ether and many others of proper boiling range may be used. Furthermore, solvents such as diethyl ether may also be used if the reaction is carried out under pressure.

Following the formation of the Grignard complex, the product is cooled and poured onto crushed ice. The mixture is made acidic by adding either hydrochloric or sulfuric acid to a pH of at least 1 to 2 or preferably, about 10-20% acid. The mixture is then permitted to settle with the formation of an organic and an aqueous layer. The former is discarded and the aqueous layer is distilled to remove terpene-like impurities. Thereafter, the solution is made strongly alkaline to a pH of about 10 to 11 or more and steam distilled, the product appearing in the distillate as an oil which can be further purified by distillation.

The compound, N-methyl-omega-phenyl-tertiary butyl-amine is prepared by reacting N-methyl isopropylidenimine with benzyl magnesium chloride. Compounds similar to N-methyl-omega-phenyl-tertiary butyl-amine may be prepared by reacting N-alkyl isopropylidenimine in like manner merely by operating with other Grignard reagents such as chain or ring substituted benzyl magnesium halides. Thus, one may react N-methyl isopropylidenimine, for example, with piperonyl-, p-chloro-benzyl-, ortho or meta-methyl benzyl-, or a methoxybenzyl magnesium halide, to cite a few of those Grignard reactants which would result in the most obviously important amino compounds.

The following examples specifically illustrate the invention:

EXAMPLE 1

*Preparation #1 of the N-methyl imine of acetone (N-methyl isopropylidenimine)*

To 520 g. (9 moles of 200% excess) of acetone at −10° C. was added 93 g. (3 moles) of liquid methylamine. The addition product crystallized out after cooling the mixture to −30°. To the cold mixture was added 75 g. of potassium hydroxide and the whole placed in a 3.5 l. autoclave under 40#/in.$^2$ of nitrogen and allowed to stand for 65 hours at 25°. The two layers which formed were separated, the aqueous layer indicated that 76% of the theoretical amount of water was removed. Distillation of the organic layer gave the ketimine, B. P. 30–40° C. at 160 mm., of which the neutral equivalent was 110 (calculated 71). The colorless ketimine was stored in a sealed vial under nitrogen and 0.2% hydroquinone.

EXAMPLE 2

*Preparation #2 of N-methyl isopropylidenimine*

58 g. (1 mol.) of acetone was cooled in a pressure bottle and 75 g. anhydrous $K_2CO_3$ was added. To the cooled mixture (−10° C.) was added 62 g. (2 mol.) of methylamine. The bottle was stoppered and allowed to warm up to room temperature (25° C.). After 5 days' standing, the bottle was cooled to 5° C., vented, and the organic liquid was decanted from the dehydrating agent and distilled. The ketimine boiled at 65–66° C./760 mm. $n_D^{25}$ 1.4069

$d_{25}^{25}$ 0.7659

EXAMPLE 3

*Preparation #3 of N-methyl isopropylidenimine*

In a pressure vessel was placed 70 g. (1.25 mole) of calcium oxide and 58 g. (1.0 mole) of acetone. The mixture was cooled to −10° or lower and 85 cc. of liquid methylamine (2.0 moles) was added. The vessel was sealed and the mixture was allowed to stand at 25° for 5–10 days when all of the liquid was absorbed in the increased volume of solid. After cooling to 5° the pressure was vented and the imine distilled directly from the pressure vessel on a steam bath and at atmospheric pressure, the distillate being collected over 25 mg. of hydroquinone. The pale-yellow distillate was then redistilled to yield N-methyl isopropylidenimine, B. P. 65–66°/760 mm.

EXAMPLE 4

*Preparation #4 of N-methyl isopropylidenimine*

To 58 grams of acetone (1 mol.) at −10° C. was added 62 grams of methylamine (2 mols). Then 25 grams of solid KOH was added, the temperature being held to approximately —10° C. The flask was securely stoppered and allowed to warm up to about 25° C. (room temperature). The mixture was allowed to stand, with occassional agitation, for about 2 days. The reaction mixture was then cooled in ice and the flask was opened. The layers were separated and the organic layer was distilled at 24–30° C. at a pressure of about 250 mm. under an oxygen-free nitrogen atmosphere. The neutral equivalent of the ketimine product was found to be 71.5 (theoretical 71) $n_D^{20}$ 1.4023

$$d_{20}^{20}\ 0.7536$$

In the procedures outlined hereinabove, the product obtained is not only N-methyl isopropylidenimine but a tautomeric isomer, illustrated by the equilibrium reaction:

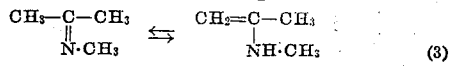

with the imine present in a substantial amount in the equilibrium admixture, actually about 40 to about 60% by weight of imine being present.

EXAMPLE 5

*Preparation of N-methyl heptylidene-2-imine*

To 114 g. (1.0 mole) of n-amyl methyl ketone at —10° in a stout flask was added 25 g. of potassium hydroxide and 62 g. (2.0 mole or 100% excess) of liquid methyl amine. The flask was stoppered and allowed to stand at 25°. In two hours the water had been practically all removed and the mixture was allowed to stand an additional two days. The pressure was vented and the water removed indicated that the reaction was 83% complete. The organic layer was then distilled and the product collected B. P. 82–4°/50 mm. A clear colorless liquid, $$d_{20}^{20}\ 0.7922$$

$n_D^{20}$ 1.4300; and a neutral equivalent of 129 (calc. 127). Reduction of the imine with 5% Pd/C gave the corresponding amine, B. P. 74–5°/40 mm.

EXAMPLE 6

*Preparation of N-methyl-1,2-dimethyl propylidenimine*

Methyl isopropyl ketone (43 g.—0.5 mol.) was cooled by Dry Ice and 35 g. of CaO was added. To the cold mixture was added 31 grams (1 mol.) of methylamine. The flask was stoppered and permitted to stand for 48 hours and the CaO had almost doubled its volume. The flask was cooled to 5° C. and the flask vented and the ketimine was distilled directly from the reaction vessel. B. P. 56° C./138 mm. Neut. equiv. found 105 (calc. 99).

EXAMPLE 7

*Preparation of N-methyl cyclohexylidenimine*

To 98 g. (1.0 mole) of cyclohexanone at —10° was added slowly with external cooling, 62 g. (2.0 moles) of liquid methyl amine and 25 g. of potassium hydroxide. The mixture was sealed and allowed to warm up to 25°. After one hour practically all of the water had been removed from the ketone-amine addition product. The aqueous layer was separated and by the increase in weight, the reaction had proceeded to theory. The organic layer was distilled and the ketimine collected B. P. 78–82/48 mm.; $n_D^{20}$ 1.4747;

$$d_{20}^{20}\ 0.9046$$

$M_D$: Calc.: 35.5–36; found: 35. The ketimine was stabilized by the addition of 0.01% hydroquinone.

EXAMPLE 8

*Preparation of N-methyl-a-cyclopropylethylidenimine*

To 84 g. (1.0 mole) of cyclopropyl methyl ketone at Dry Ice temperature was added 70 g. of calcium oxide and 62 g. (2.0 mole or 100% excess) of liquid methyl amine. The mixture was allowed to warm up to 25° in a closed vessel where after twelve days, the increase in volume of calcium oxide indicated the reaction was complete. The ketimine was distilled directly from the reaction vessel, B. P. 56°/60 mm., $n_D^{20}$ 1.4529, neutral equivalent: Calc. 97, found 100.

EXAMPLE 9

*Preparation #1 of N-methyl-omega-phenyl-tertiary-butyl-amine*

An already prepared 1 M. solution of benzyl magnesium chloride in diethyl ether was used for this reaction. To 420 cc. (0.42 mole or 20% excess) of 1 M. benzyl magnesium chloride in diethyl ether was added under nitrogen atmosphere over a period of 25 minutes with rapid stirring, a solution of 25 g. (0.35 mole) of the N-methylimine of acetone in 75 cc. of diethyl ether (anhydrous). The temperature rose to the reflux point and after an additional hour of stirring at room temperature, the complex was poured onto 200 g. of crushed ice. After enough hydrochloric acid had been added to bring the pH to 1–2, the mixture was heated to 70° C. on a steam bath to remove the ether and to complete the hydrolysis. The organic layer present was separated and the acidic aqueous layer was extracted twice with 100-cc. portions of ether; both the organic layer and ether extracts were discarded. The aqueous layer was made alkaline to pH of 10 with 40% sodium hydroxide, extracted by centrifuging with ether, and the ether extracts dried over 0.5 g. magnesium sulfate. Removal of the ether under reduced pressure and distillation of the residue produced N-methyl-omega-phenyl-tertiary-butylamine, B. P. 60–67° at 0.8 mm. The neutral equivalent was 152 (calculated value: 163). The amine forms a picrate which melts at 146–9° and gives no depression with a mixed melting point of the picrate of a known sample, M. P. 152–152.5°.

EXAMPLE 10

*Preparation #2 of N-methyl-omega-phenyl-tertiary-butyl-amine*

The diethyl ether was removed by heating from a solution of benzyl magnesium chloride to yield 0.15 mole of the Grignard complex. During the removal of ether 150 cc. of dry commercial kerosene was added. The apparatus was made free from oxygen by flushing with pure nitrogen. When the temperature reached 155° C., a solution of 7.1 g. (0.10 mole) of N-methyl isopropylidenimine in 25 cc. of kerosene was added in a manner so as to keep the temperature between 145° and 155°; it was necessary when the temperature reached 145°, to stop the addition of imine and remove the diethyl ether which was liberated during the reaction to obtain a temperature of 155° again. This process was repeated as often as necessary to maintain the temperature range of 145°–155°, three times being sufficient in this case. After the addition of imine had been completed, the mixture was allowed to stir a few minutes and after cooling was poured onto about 100 g. of crushed ice and made acidic to pH of 2 with 30% sulfuric acid. The kerosene layer was separated and washed with water. The water wash was combined with the aqueous acidic layer and the combined solutions extracted several times with chloroform, discarding the chloroform extracts. The clear aqueous layer was then made alkaline to pH of 10–11 and extracted several times with ether, utilizing the centrifuge to break emulsions. After drying the ether layer over sodium hydroxide, the solution was distilled, collecting the N-methyl-omega-phenyl-tertiary-butylamine as a fraction boiling about 75° at 2.5 mm.

EXAMPLE 11

*Preparation of N-methyl-8-pentadecylidenimine*

To 45.3 g. (0.2 mole) of 8-pentadecanone and 5 g. of potassium hydroxide at about —10°, was added 17 g. (250% excess) of liquid methylamine. The whole was sealed in a pressure vessel and allowed to warm up to 25° where it stood for four days with occasional shaking. The mixture was cooled and the potassium hydrate removed by filtration with suction through a layer of charcoal. The organic liquid was distilled, B. P. 109–110° at 0.5 mm.; $n_D^{20}$ 1.4494; neutral equivalent 264 (calc. 239).

EXAMPLE 12

*Preparation of N-methyl-n-pentylidene-3-imine*

To 43 g. (0.5 mole) of diethylketone in a flask suitable to withstand pressure at about —10° C. was added 12.5 g. of flake potassium hydroxide and 31 g. (1 mole or 100% excess) of methylamine. The flask was allowed to stand 48 hours at 25°. It was then cooled to 5°, filtered through charcoal and distilled; there resulted an impure distillate which was assumed to be a mixture of the ketimine and unchanged ketone. The distillate was recombined with the residue in the still pot and placed in a pressure flask with 25 g. of calcium oxide and 25 cc. of liquid methylamine (mixed at about −10° C.). The flask was stoppered and allowed to stand at 25° for three days. Direct distillation from the calcium oxide at atmospheric pressure produced, after a considerable forerun, 9 g. of N-methyl-n-pentylidene-3-imine, B. P. 113°; $n_D^{20}$ 1.4220; neutral equivalent 103 (theory 99).

The foregoing examples have been given in order to disclose illustrative examples in preparing valuable imines and amine derivatives and should not be considered limitative of the invention. With regard to the amino products, these are useful not only as intermediates in the preparation of other organic compounds but, as was pointed out above, most of them are also useful from a pharmacological viewpoint since they possess a marked sympathomimetic action whether in the form of the free base or as salts. The latter may be formed from the free base by methods now well-known in the art and need not be described here. As examples of amine salts, which have been found to be most suitable for pharmacological use, may be mentioned the hydrochloride, the sulfate, the phosphates, particularly the primary phosphate, and the benzoate salts.

Having described our invention, we claim:

1. The process for forming imines comprising, reacting a primary lower alkyl amine in the liquid phase with a ketone of the formula $$R^1-CO-R^2$$

wherein $R^1$ and $R^2$ each represent members of the group consisting of alkyl, cycloalkyl and cycloalkyl-lower alkyl radicals under alkaline conditions, thus forming an addition compound containing a hydroxyl group as a reaction product, removing water from said reaction product by reacting the latter at a temperature below about 80° C. with a dehydrating agent consisting essentially of an alkaline compound selected from the group consisting of potassium hydroxide, potassium carbonate, and alkaline earth metal oxides, said step being carried out under conditions to prevent oxidation.

2. The process for preparing N-methyl isopropylidenimine comprising reacting acetone with liquid methylamine under alkaline conditions, and removing water from the reaction product at a temperature below about 80° C. with potassium hydroxide, the desired imine product being produced under conditions to prevent oxidation.

3. The process for preparing N-methyl isopropylidenimine comprising reacting acetone with liquid methylamine under alkaline conditions, and removing water from the reaction product at a temperature below about 80° C. with potassium carbonate, the desired imine product being produced under conditions to prevent oxidation.

4. The process for preparing N-methyl isopropylidenimine comprising reacting acetone with liquid methylamine under alkaline conditions, and removing water from the reaction product at a temperature below about 80° C. with calcium oxide, the desired imine product being produced under conditions to prevent oxidation.

References Cited in the file of this patent

UNITED STATES PATENTS

| | | |
|---|---|---|
| 1,938,890 | Britton et al. | Dec. 12, 1933 |
| 2,421,937 | Haury | June 10, 1947 |
| 2,422,013 | Haury et al. | June 10, 1947 |
| 2,533,723 | Dombrow | Dec. 12, 1950 |
| 2,583,729 | Deanesly | Jan. 29, 1952 |

FOREIGN PATENTS

| | | |
|---|---|---|
| 583,565 | Germany | Sept. 21, 1933 |